| United States Patent Office | 2,991,099
Patented July 4, 1961 |
|---|---|

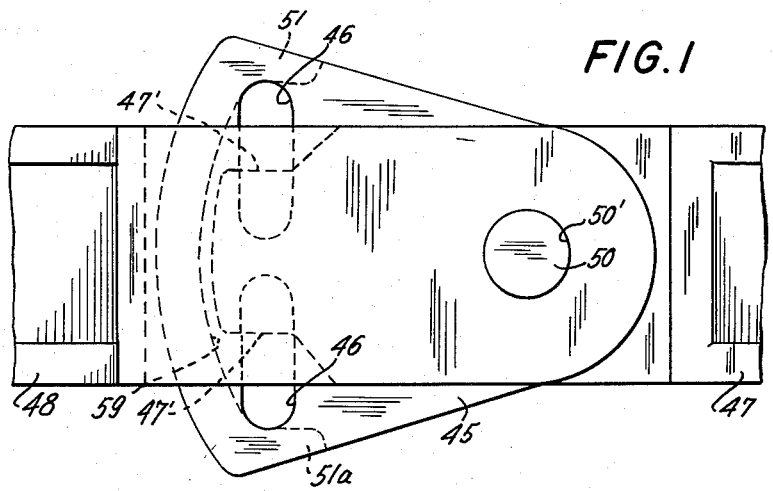
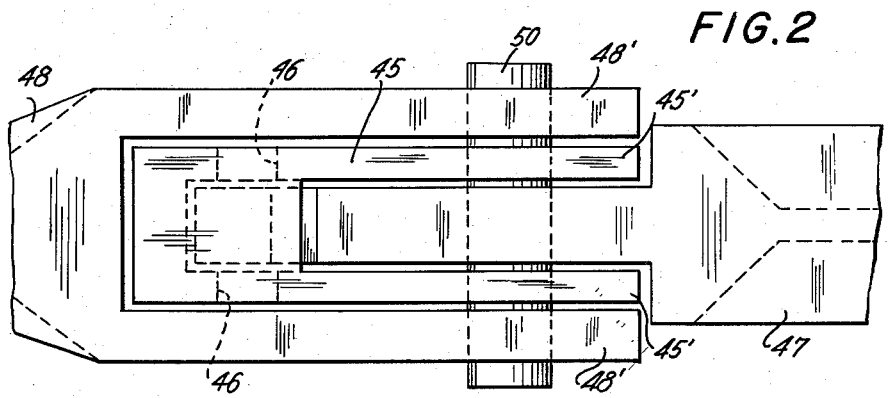
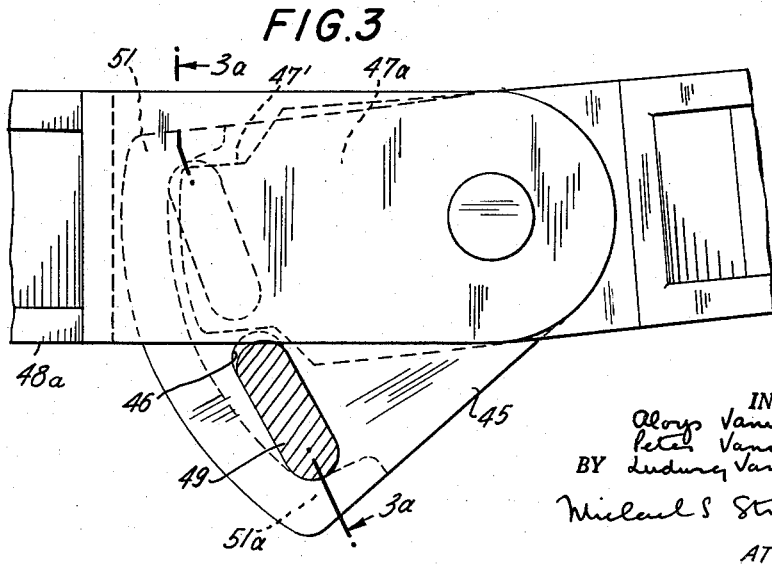

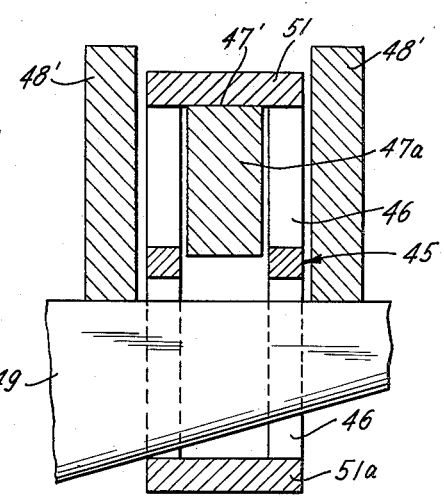
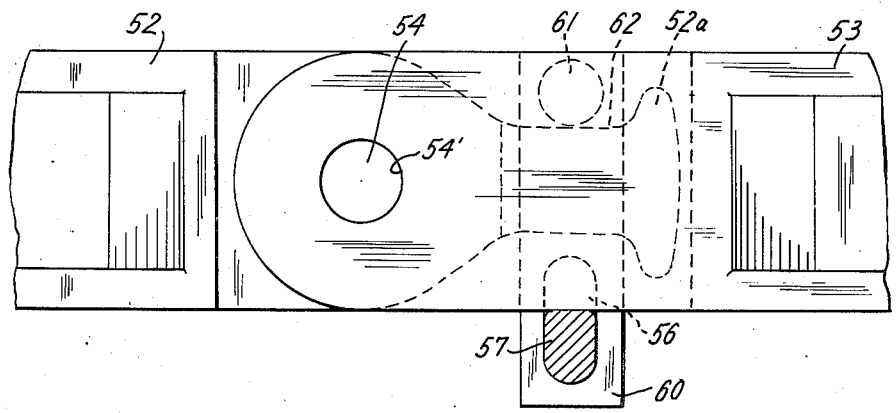
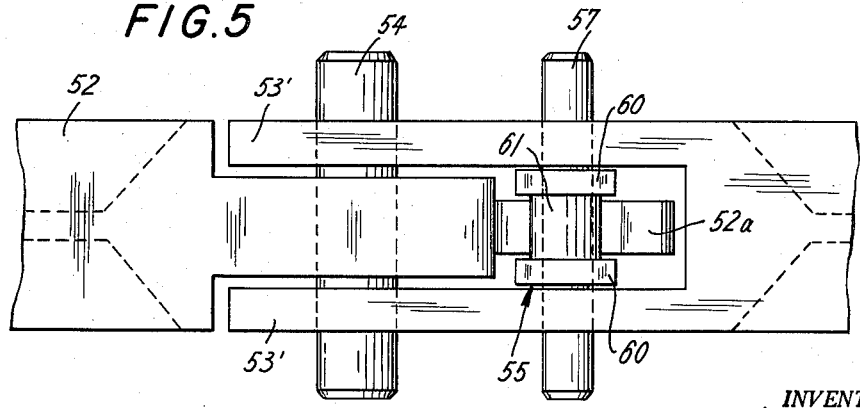

2,991,099
CONNECTING STRUCTURE FOR BEAMS OF A ROOF SUPPORT OR THE LIKE
Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany
Original application May 23, 1955, Ser. No. 510,204. Divided and this application Dec. 24, 1958, Ser. No. 782,852
In France July 8, 1948
Public Law 619, Aug. 23, 1954
Patent expires July 8, 1968
3 Claims. (Cl. 287—99)

This application is a divisional application of our copending application Serial No. 510,204, filed on May 23, 1955.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the beams together in such a way that they provide an extremely strong support.

Another object of the preesnt invention is to provide a beam connecting structure of the above type which is exceedingly simple and which prevents angular displacement of a pair of beams with respect to each other in either dircetion.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall. A second beam has an end portion extending between the spaced walls of the first beam and formed with openings aligned with those of the spaced walls. A pivot pin extends through one set of aligned openings so that the first and second beams are turnable with respect to each other to a desired angular position, and one or more elongated wedge members are provided for locking the beams in a given angular position as well as for turning the beams to the desired angular position.

According to another feature of the invention, a locking member is movably mounted on one of the beams for movement in the clearance between the end portions of the beams, the movement being limited by abutment means on one of the beams. When abutting against the aforesaid abutment means, the locking member partially projects beyond the outer face of the other beam. It is equipped with an opening in the projecting portion through which a wedge member can be inserted for abutment against the outer face of the other beam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side elevational view illustrating one possible manner of interconnecting a pair of beams;

FIG. 2 is a top plan view of the structure of FIG. 1;

FIG. 3 is a fragmentary side elevatioal view showing the structure of FIGS. 1 and 2 in an operative position;

FIG. 3a is a sectional view taken along line 3a—3a of FIG. 3 viewed in the direction of the arrows;

FIG. 4 is a fragmentary side elevational view of another embodiment of the present invention; and FIG. 5 is a top plan view of the structure of FIG. 4.

Referring now to the drawings, it will be seen that the beam 48 of FIGS. 1–3a has a bifurcated end portion provided with a pair of spaced walls 48', 48' between which an end portion of the beam 47 extends with considerable clearance, as indicated in FIG. 2. The beams 47 and 48 are supported in a known way by suitable props not shown in the drawing and serving to hold the beams against the roof of a mine shaft or the like. A substantially U-shaped locking member 45 is located within the bifurcated end of beam 47 and has spaced walls 45', 45' which receive the end of beam 47, these spaced walls as well as those of beam 48 and the end of beam 47 being respectively formed with aligned openings 50' which receive the pivot pin 50. Beams 47 and 48 are thus pivotally connected for angular movement with respect to each other. Through such angular movement of the beams it is possible to arrange them so that they correspond to the contour of a particular roof to be supported. The U-shaped member 45 is formed at the inner end of the space between its walls with an elongated recess 59 receiving a reduced end 47a of beam 47, this recess providing stops 51 and 51a on the member 45, as indicated in FIG. 3. When the locking member 45 is turned about the pivot pin 50 in clockwise or counter clockwise direction, the stops 51 or 51a will respectively abut against the upper or lower face 47' on the reduced end 47a of beam 47. The faces 47' form, therefore, abutment means for limting the movement of locking member 45. The side walls 45' of the locking member 45 are further formed with pairs of aligned openings 46 one set of which may receive an elongated wedge member 49, as indicated in FIGS. 3 and 3a. This wedge member 49 is located beyond the bottom face 48a of beam 48 and engages bottom face 48a while the narrowed end 47a of beam 47 engages the stop 51 to lock the beams in a desired angular position. The wedge member 49 may be driven through the openings 46 of member 45 to an extent which determines the angular position between the beams.

The embodiment of FIGS. 4 and 5 includes a beam 53 having a bifurcated end portion provided with spaced walls 53', 53' between which an end of beam 52 extends, the beam 52 and the spaced walls respectively being formed with aligned openings 54' which receive the pivot pin 54. The end 52a of beam 52 has considerable clearance between the spaced walls 53', 53' at the end of beam 53 and a U-shaped locking member 55 formed by two spaced, parallel plates or walls 60, 60 fixedly connected at the upper ends thereof by a pin 61 hangs downwardly from the end 52a of member 52 with the plates 60 at substantially right angles thereto and with the pin 61 abutting against an upper curved face 62 on the end of beam 52. The curved face 62 forms, therefore, an abutment means for limiting the movement of locking member 55, as indicated in FIG. 4. The U-shaped member 55 has spaced side walls between which the end 52a extends and member 55 is itself located between the side walls at the end of beam 53 and extends downwardly beyond beam 53 as indicated in FIG. 4. The spaced side walls of member 55 are formed with openings 56 which also extend downwardly beyond beam 53 and through which a wedge member 57 extends so that this wedge member determines the angular position of beams 52 and 53, wedge member 57 engaging the bottom face of the beam 53.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supporting structure, in combination, a first beam having a bifurcated end portion provided with a pair of spaced walls each of which is formed with an opening, the opening of one of said walls being aligned with that of the other of said walls; a second beam having an end portion extending between said walls of said bifurcated end portion of said first beam with clearance, and formed with an opening aligned with said pair of aligned openings; a pivot pin extending through said openings in said first and in said second beam; a locking member movably mounted on one of said beams for movement in said clearance; abutment means on one of said beams for limiting the movement of said locking member, said locking member having a portion projecting beyond an outer face of one of said beams when abutting against said abutment means on said one beam, said projecting portion being formed with an opening capable of alignment with said outer face of said other beam when said locking member abuts against said abutment on said one beam; and a wedge member extending through said opening in said projecting portion for abutment against said outer face.

2. In a supporting structure, in combination, a first beam having a bifurcated end portion provided with a pair of spaced walls respectively formed with a pair of aligned openings; a second beam having an end portion extending with substantial clearance between said pair of spaced walls and formed with an opening aligned with those of said spaced walls; a substantially U-shaped locking member located between said pair of spaced walls of said first beam and itself having a pair of spaced walls between which said end portion of said second beam extends, said walls of said U-shaped member respectively being formed with a first pair of openings aligned with those of said first and second beams and with a second pair of openings extending beyond an outer face of said first beam; a pivot pin extending through all of said aligned openings; and a wedge member extending through said second pair of openings and engaging said outer face of said first beam, said second beam extending into a recess formed in the inner end of the space between the walls of said locking member.

3. In a supporting structure, in combination, a first beam having a bifurcated end portion provided with a pair of spaced walls respectively formed with a pair of aligned openings; a second beam having an end portion extending with clearance between said spaced walls and formed with an opening aligned with those of said spaced walls; a pivot pin extending through all of said openings; a substantially U-shaped locking member located between said spaced walls of said first beam, and having a pair of spaced walls extending beyond an outer face of said first beam and between which said end portion of said second beam extends, said walls of said U-shaped member being formed with openings extending beyond said outer face of said first beam; and a wedge member extending through said latter openings and engaging said outer face of said first beam.

References Cited in the file of this patent

UNITED STATES PATENTS

| 2,729,945 | Gerlach | Jan. 10, 1956 |

FOREIGN PATENTS

| 502,211 | Belgium | Apr. 14, 1951 |
| 794,008 | Great Britain | Apr. 23, 1958 |
| 1,009,905 | France | Mar. 12, 1952 |